United States Patent
May

(10) Patent No.: US 6,509,890 B1
(45) Date of Patent: Jan. 21, 2003

(54) MINI-TRACKPOINT IV POINTING DEVICE

(75) Inventor: Kim Wesley May, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/052,920

(22) Filed: Mar. 31, 1998

(51) Int. Cl.[7] .............................................. G09G 3/28
(52) U.S. Cl. ...................................... 345/167; 345/157
(58) Field of Search ................................. 345/163, 159, 345/156, 161, 167, 157, 169, 168; 250/307; 341/33, 20; 340/710; 710/73

(56) References Cited

U.S. PATENT DOCUMENTS

| | | | | |
|---|---|---|---|---|
| 4,567,364 A | * | 1/1986 | Kano et al. | 250/307 |
| 4,949,080 A | * | 8/1990 | Mikan | 345/161 |
| 4,977,397 A | * | 12/1990 | Kuo et al. | 345/163 |
| 5,164,713 A | * | 11/1992 | Bain | 345/145 |
| 5,268,675 A | * | 12/1993 | Garthwaite et al. | 345/163 |
| 5,428,355 A | * | 6/1995 | Jondrow et al. | 341/20 |
| 5,473,347 A | * | 12/1995 | Collas et al. | 345/169 |
| 5,572,237 A | * | 11/1996 | Crooks et al. | 345/156 |
| 5,579,032 A | * | 11/1996 | Busch | 345/157 |
| 5,691,747 A | * | 11/1997 | Amano | 345/167 |
| 5,726,684 A | * | 3/1998 | Blankenship et al. | 345/167 |
| 5,771,038 A | * | 6/1998 | Wang | 345/163 |
| 5,828,363 A | * | 10/1998 | Yaniger et al. | 345/156 |
| 5,831,593 A | * | 11/1998 | Rutledge | 345/156 |
| 5,870,082 A | * | 2/1999 | Selker et al. | 345/168 |
| 5,898,424 A | * | 4/1999 | Flannery | 345/163 |
| 5,910,798 A | * | 6/1999 | Kim | 345/163 |
| 5,912,659 A | * | 6/1999 | Rutledge et al. | 345/156 |
| 5,914,703 A | * | 6/1999 | Herng-Chuen | 345/157 |
| 5,920,734 A | * | 7/1999 | Holmdahl | 710/73 |
| 5,945,979 A | * | 8/1999 | Rutledge et al. | 345/161 |
| 5,949,354 A | * | 9/1999 | Chang | 341/33 |
| 5,963,195 A | * | 10/1999 | Gregg et al. | 345/159 |
| 5,966,117 A | * | 10/1999 | Seffernick et al. | 345/161 |
| 6,091,404 A | * | 7/2000 | Hong et al. | 345/167 |

* cited by examiner

Primary Examiner—Dennis-Doon Chow
Assistant Examiner—Uchendu O. Anyaso
(74) Attorney, Agent, or Firm—Robert Buckley; Daniel E. Johnson

(57) ABSTRACT

An auxiliary isometric computer pointing device for attachment to a P/S-2 mouse port connector along the right-hand side of the IBM ThinkPad laptop computer includes a TrackPoint IV pointing assembly, a mating electrical connector, a manually operated momentary switch, all enclosed in a compact, self-aligning enclosure. When provided with a suitable mouse driver, the laptop computer equipped with the auxiliary pointing device permits 3-D manipulation and alternative scrolling operations, independent of normal cursor positioning. The auxiliary pointing device derives operating power via the P/S-2 connector and provides a standard mouse output signal.

15 Claims, 3 Drawing Sheets

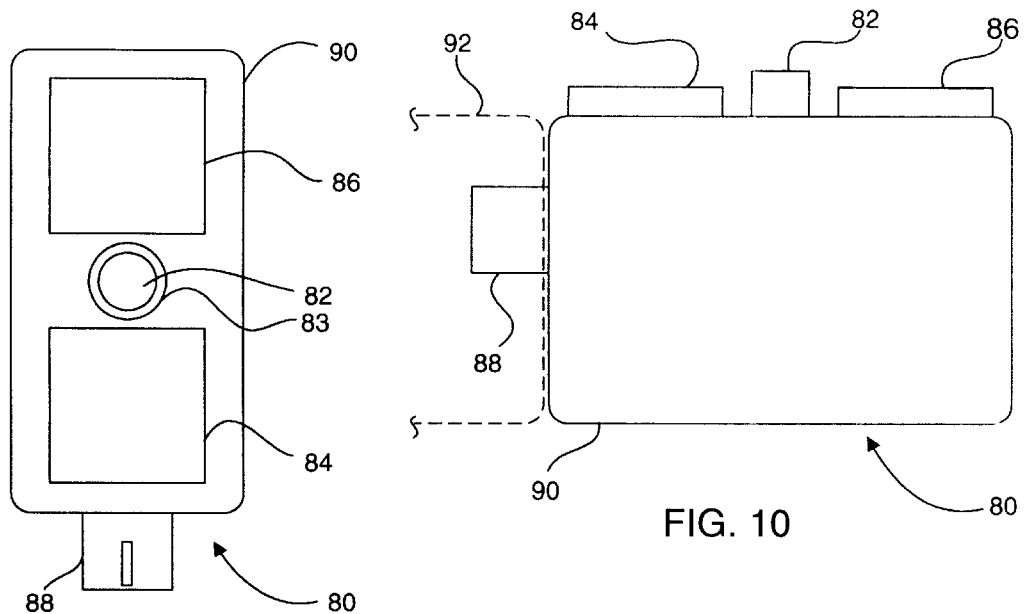
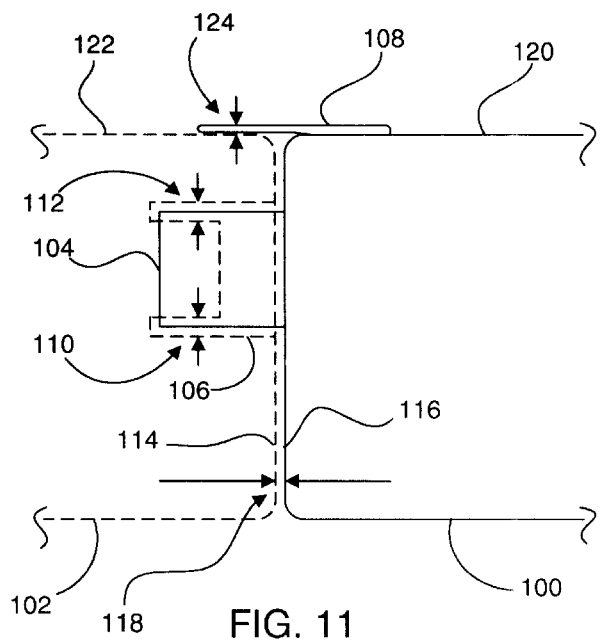

MINI-TRACKPOINT IV POINTING DEVICE

RELATED APPLICATIONS

This Application is related to a co-pending U.S. patent application Ser. No. 09/052,805 entitled "Low Noise Circuit Board for TrackPoint® Pointing Device," filed on the same date as the present Application, also to co-pending U.S. Patent Application entitled "Force Transducer With Screen Printed Strain Gauges," Ser. No. 08/181,648, filed Jan. 14, 1994, and to co-pending U.S. Patent Application entitled "Floating Triangle Analog-to-Digital Conversion System and Method," Ser. No. 08/773,420, filed Dec. 27, 1996, all assigned to the International Business Machines Corporation. The disclosure of each related Application is incorporated herein by reference.

FIELD OF THE INVENTION

The invention generally relates to information processing systems, and more specifically, to computer pointing devices used with graphical user interfaces. The invention has a particular applicability to the ThinkPad® line of laptop computers provided by IBM®, and the IBM TrackPoint® IV computer pointing device. (IBM, ThinkPad and TrackPoint are registered trademarks of the International Business Machines Corporation.)

BACKGROUND OF THE INVENTION

The IBM ThinkPad line of laptop computers includes an isometric pointing device embedded at a convenient location within the keyboard. This primary pointing device and related user operable momentary switches are used for manipulation of the computer's graphical user interface.

Each ThinkPad computer also includes a P/S-2 mouse port connector located near the rear along a right-hand side of the laptop enclosure. This connector permits a secondary pointing device to be attached for two-handed manipulation or for use by those who require a different type of manipulation device. The P/S-2 connector provides operating power and is compatible with a standard mouse output signal.

It would be desirable to connect a second TrackPoint IV pointing device to this connector without having to make the connection via a cable. What is needed is a compact, self-contained pointing device that can attach directly to the P/S-2 connector at the side of the ThinkPad computer. The secondary pointing device should derive operating power from the connector, and should provide a standard mouse output signal. The secondary device should be compatible with the ThinkPad computer primary device so that two-handed 3-D manipulation and simple document scrolling are easily and naturally accomplished.

SUMMARY OF THE INVENTION

Accordingly, it is an object of the present invention to provide a compact, self contained pointing device which can be connected to the P/S-2 mouse port at the right-hand side of each ThinkPad laptop computer.

This object is met by a computer pointing device including a user manipulation member;
  sensors mechanically coupled to said member and providing sensor signals corresponding to user manipulation of the member,
  a transform circuit connected to receive the sensor signals for transforming the signals to at least one pointing device output signal;
  a device electrical connector adapted for mating with a compatible receptacle for receiving operating power and for transmitting the at least one pointing device output signal; and
  a frame for supporting the user manipulation member, the sensors, the transform circuit and the device electrical connector in a fixed relation with respect to the compatible receptacle.

In a specific embodiment of the invention, this object is met by a computer pointing device including a mini-DIN, 6-pin male connector for making a compatible connection with the female receptacle of the P/S-2 mouse port;
  a TrackPoint IV pointing device connected to the male connector for receiving operating power and supplying a standard mouse output signal;
  at least one manually operated momentary switch connected to the TrackPoint IV pointing device for providing select, activate, drag-and-drop signals via the standard mouse output signal; and
  an enclosure for supporting the male connector, the TrackPoint IV pointing device, and the at least one manually operated momentary switch in a fixed relation with respect to the female receptacle.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein:

FIG. 9 is a top view, of another embodiment of a computer pointing device according to the present invention.

FIG. 10 is a front view of the computer pointing device shown in FIG. 9.

FIG. 11 is a partial front view of a computer pointing device illustrating cooperation between the device and a laptop computer for maintaining a precise alignment.

DESCRIPTION OF THE PREFERRED EMBODIMENT

Figure 1:
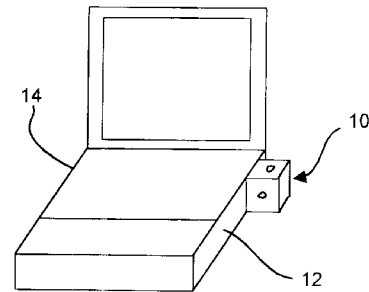
FIG. 1 is a perspective view illustrating a laptop computer attached to a pointing device according to one aspect of the present invention.

With reference to FIG. 1 there is shown a perspective diagram of a pointing device, designated generally by the numeral 10, attached along a right side 12 of a laptop computer 14 in accordance with one aspect of the present invention. The IBM ThinkPad line of laptop computers includes a mini-DIN, 6-pin female receptacle located near the rear along the right side 12, in the approximate location of the pointing device 10 as illustrated in FIG. 1. The receptacle (not shown) is compatible with a standard IBM P/S-2 mouse port for attachment of a computer pointing device. The receptacle provides operating power for the standard mouse pointing device and accepts an industry-standardized digitally formatted mouse-type input signal from the device. The present invention represents a variety of embodiments of computer pointing devices 10 for attachment to the receptacle along the right side 12 of the typical ThinkPad laptop computer 14.

The standard ThinkPad laptop computer includes a TrackPoint pointing device embedded within the typing keyboard (not shown). When equipped with a standard mouse software driver, the laptop computer 14 sums the pointing commands of the embedded and the P/S-2 input for commanding cursor position. But when provided with specialized software drivers, the ThinkPad permits several alternative modes of operation using the separate pointing devices. Such alternative modes include: one of the pointing devices being used for cursor positioning and the other pointing device being used for scrolling; and the two pointing devices being used for 3-dimensional navigation in a virtual 3-dimensional space.

Figure 2:
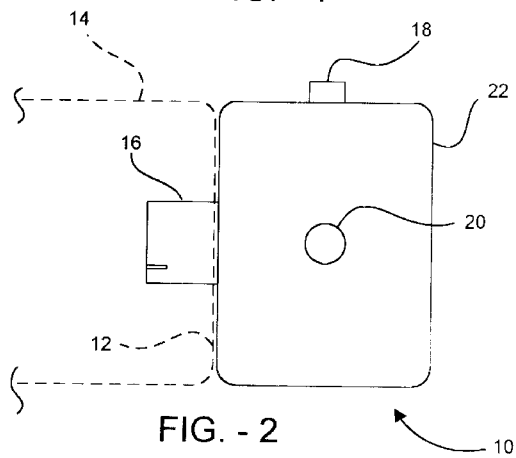
FIG. 2 is a front view of the computer pointing device of FIG. 1.

FIGS. 2–5 illustrate a preferred embodiment of the computer pointing device according to one aspect of the present invention. FIG. 2 is a front view of the pointing device 10 shown adjacent to the right side 12 of the ThinkPad laptop computer 14. The laptop computer is represented by the broken line 14. The pointing device 10 includes a mini-DIN, 6-pin male connector 16 which is compatible with the female receptacle (not shown). The pointing device 10 also includes a user manipulation member 18 extending above a top side, a manually-operated momentary switch 20, located at a front side, and an enclosure 22 for supporting these components.

Figure 3:
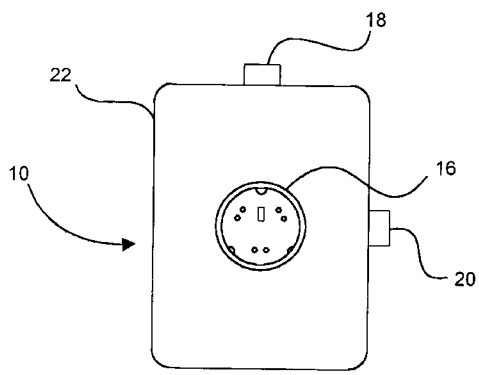
FIG. 3 is a left side view of the computer pointing device of FIG. 1

FIG. 3 is a left side view of the pointing device 10, illustrating the male connector 16, the manipulation member 18, the momentary switch 20, and the enclosure 22.

Figure 4:
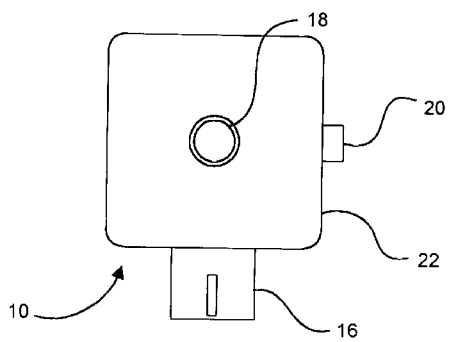
FIG. 4 is a top view of the computer pointing device of FIG. 1.

FIG. 4 is a top view of the pointing device 10, illustrating the connector 16, the manipulation member 18, the momentary switch 20, and the enclosure 22.

Figure 5:
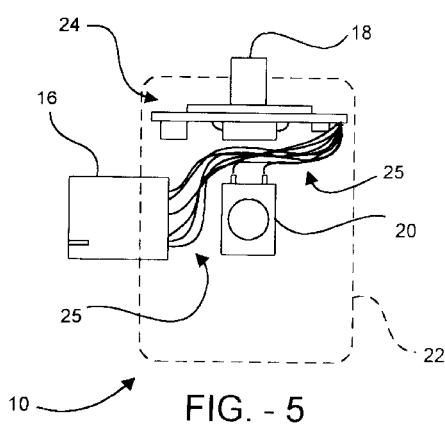
FIG. 5 is a cutaway front view of the computer pointing device of FIG: 1

FIG. 5 is a cutaway front view of the computer pointing device 10 in which the enclosure is shown by the broken line 22. The manipulation member 18 is shown as part of a TrackPoint IV assembly 24. The connector 16 and the momentary switch 20 are connected to the TrackPoint IV assembly 24 via electrical wires, designated generally by the numeral 25.

Figure 6:
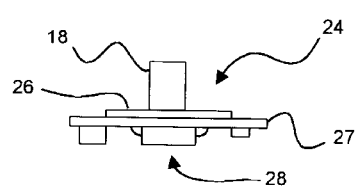
FIG. 6 is a side view of a TrackPoint IV computer pointing device as shown in FIG. 5.

FIG. 6 is a side view of a TrackPoint IV assembly 24, which includes the manipulation member 18, strain gauge sensors 26, a printed circuit card 27, and electronic components including integrated circuits, designated generally by the numeral 28. The assembly 24 is described in the related U.S. Patent Application entitled "Force Transducer With Screen Printed Strain Gauge." But, in general, the circuit board 27 supports and interconnects the other components 28, including the strain gauge sensors 26. The manipulating member 18 is mechanically attached to the sensors 26, forming an isometric pointing device in which pressure on the member 18 in three orthogonal axes produce corresponding electrical changes in sensor output signals. These sensor output signal changes are processed by the components 28 to provide the standardized mouse output signal. Operating power is obtained from the connector 16 (FIGS. 2–5). The momentary switch 20 (FIG. 5) provides an input to the assembly 24 and forms a portion of the standardized mouse output signal.

In typical operation, user pressure applied to the manipulation member 18 from side-to-side and forward-backward are used for cursor positioning. In one specific embodiment of the invention, pressure in a downward direction against the tip of the manipulation member is converted by the assembly 24 into a momentary switch signal and made a part of the standardized mouse output signal. In this specific embodiment, momentarily pressing in a downward direction and then releasing the tip of the manipulation member 18 is recognized by a mouse driver as operation of one standardized mouse switch.

Figure 7:
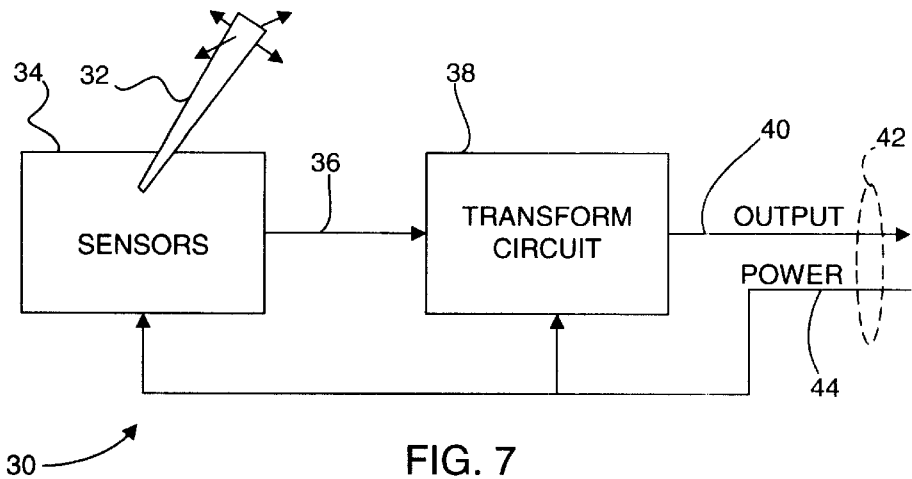
FIG. 7 is a block diagram illustrating another aspect of the present invention.

FIG. 7 is a block diagram which illustrates another embodiment of a computer pointing device according to the present invention. The computer pointing device is designated generally by the numeral 30 and includes a user manipulation member 32, sensors 34, a transform circuit 38 providing an output signal 40 to a device electrical connector 42 for mating with a compatible receptacle (not shown). Operating power 44 for the sensors 34 and for the transform circuit 38 is derived from the compatible receptacle via the device electrical connector 42.

The sensors 34 are mechanically coupled to the user manipulation member 32 for providing sensor signals 36 which correspond to user manipulation of the member. The transform circuit is connected to receive the sensor signals 36 and to transform the signals into at least one pointing device output signal 40. In a specific embodiment, the user manipulation member 32 defines a control stick which is grasped by the user and manipulated in three orthogonal axes for producing changes in the at least one output signal described above with respect to FIG. 6.

In another specific embodiment, the control stick and sensors define an isometric pointing device (see, for example the TrackPoint IV assembly 24 of FIG. 6). In an isometric pointing device changes in the sensor output signals 36 are proportional to pressure applied to the user manipulation member 32; the member itself moves only an imperceptible amount in response to an applied pressure.

In a specific embodiment the computer pointing device 30 includes a frame (22 of FIG. 5) for supporting the user manipulation member 32, the transform circuit 38, and the device electrical connector 42 in a fixed relation with respect to the compatible receptacle (see, e.g., FIG. 11).

Figure 8:
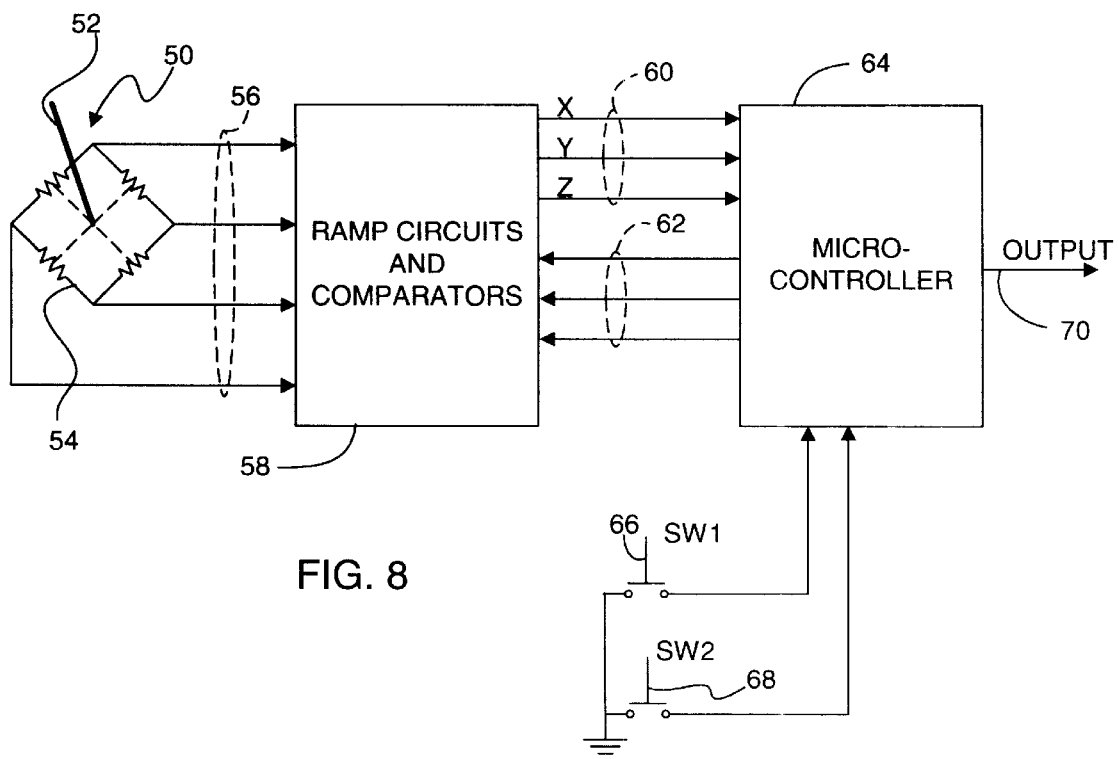
FIG. 8 is a schematic diagram illustrating details of another embodiment of a computer pointing device according to the present invention.

FIG. 8 is a schematic diagram which illustrates a computer pointing device according to another aspect of the present invention. The computer pointing device is designated generally by the numeral 50 and includes a control stick 52, sensors defining a strain gauge assembly defining a bridge network 54 coupled to the control stick 52, strain gauge output signals 56, ramp circuits and comparators 58, orthogonal strain signals 60, ramp control signals 62, a micro-controller 64, a pair of manually operated momentary switches 66, 68, and an output signal 70.

FIG. 8 illustrates a preferred embodiment of the electrical circuit of the computer pointing devices defined by the invention. Though not shown in FIG. 8, operating power for the pointing device is derived from the female receptacle via the male connector (42 of FIG. 7). The ramp circuits and comparators 58 and the micro-controller 64 correspond to the transform circuit 38 of FIG. 7.

The specific operation of the circuits 58 and 64 in converting the strain gauge output signals 56 to a standard mouse output signal 70 is described in related U.S. Patent Applications entitled "Force Transducer With Screen Printed Strain Gauge," and "Floating Triangle Analog-to-Digital Conversion System and Method." In general, the low level analog strain gauge output signals 58 are converted to three orthogonal digital signals. The duration of each of the digital signals is proportional to a pressure applied by a user to the control stick 52 along one of three defined orthogonal axes. Generally, the two axes correspond to the horizontal and vertical axes of a computer display, and a third axis is typically reserved for use as an additional momentary switch, as described above. The micro-controller 64 uses the ramp control signals 62 to control the conversion process. In general, the control stick 52, the strain gauges 54, the ramp circuits and comparators 58, and the micro-controller 64 define the TrackPoint IV assembly 24 of FIG. 6.

The computer pointing device illustrated by FIG. 8 includes two momentary switches 66 and 68. The switches a connected to the micro-controller 64 for controlling pre-determined bits of the digitally formatted standard mouse output signal 70. In a specific embodiment, only a single momentary switch is present. In another specific embodiment, a single momentary switch is present, and the Z-axis of control stick manipulation is encoded to provide a second momentary switch, as described above. Other combinations of separate momentary switches 66, 68 and use of the Z-axis manipulation will be apparent to a person of ordinary skill.

FIG. 9 is a top view of another embodiment of a computer pointing device according to the present invention. The computer pointing device is designated generally by the numeral 80, and includes a user manipulation member 82, first and second manually operated momentary switches 84, 86, a mini-DIN, 6-pin male connector 88, and an enclosure 90. In a specific embodiment, the computer pointing device 80 includes a TrackPoint IV assembly (24 of FIG. 6), a manipulation member of which extends through an opening 83 in the enclosure 90 as the user manipulation member 82. The two momentary switches 84, 86 correspond to the two momentary switches 66, 68 of the schematic diagram shown in FIG. 8. In a typical operation, the user manipulates the member 82 with a finger tip for positioning a computer cursor, and uses the two momentary switches 84, 86 as left and right mouse buttons.

FIG. 10 is a front view of the computer pointing device 80 of FIG. 9, showing its relative alignment with a laptop computer 92 to which it is connected.

Finally, FIG. 11 is a partial front view of a specific embodiment of a computer pointing device, designated by the numeral 100. FIG. 11 also illustrates apportion of a laptop computer 102, a mini-DIN, 6-pin male connector 104, a mating female receptacle 106, and a vertical stabilizing member 108.

The mini-DIN, 6-pin connector series includes a mechanical detent between the male connector 104 and the female receptacle 106. The detent is illustrated by the opposing vertical arrowheads 110, 112. The effect of the mechanical detent is to create a moderate force which resists a disconnecting of the mated male and female elements 104, 106, once these elements have been mated. In a specific embodiment of the computer pointing device 100, the vertical stabilizing member 108 is not present (FIG'S 2 and 10). In this embodiment (FIG'S. 2 and 10) the right-hand side 114 of the laptop computer 102 cooperates with the left-hand side 116 of the computer pointing device 100 and the mated connector elements 104, 106 to maintain the computer pointing device 100 in a fixed relation with respect to the female receptacle 106. The cooperation between the sides 114, 116 is illustrated by horizontal opposed arrowheads 118.

In another specific embodiment, the computer pointing device 100 includes the vertical stabilizing member 108 located on a top surface 120 of the pointing device 100. The member 108 is located along a left-hand edge of the top surface 120 and is fixedly attached thereto. A portion of the member 108 extends above and in sliding contact with a portion of a top surface 122 of the laptop computer 102. The member 108 cooperates with the top surface 122 to assist in further stabilizing the pointing device 100 in a precise alignment with respect to the female receptacle 106 and the laptop computer 102. The cooperation between the member 108 and the top surface 122 of the laptop computer 102 is illustrated by opposed vertical arrowheads 124.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. A computer pointing device, comprising:
   a user manipulation member;
   sensors mechanically coupled to said member and providing sensor signals corresponding to user manipulation of the member;
   a transform circuit connected to receive the sensor signals for transforming the signals to at least one pointing device output signal;
   a device electrical connector adapted for mating with a compatible receptacle for receiving operating power and for transmitting the at least one pointing device output signal; and
   a frame for supporting the user manipulation member, the sensors, the transform circuit and the device electrical connector in a fixed relation with respect to the compatible receptacle, wherein:
   the user manipulation member defines a control stick;
   the control stick and the mechanically coupled sensors define an isometric pointing device; and
   the isometric pointing device is a TrackPoint IV pointing device.

2. A computer pointing device, comprising:
   a user manipulation member;
   sensors mechanically coupled to said member and providing sensor signals corresponding to user manipulation of the member;
   a transform circuit connected to receive the sensor signals for transforming the signals to at least one pointing device output signal;
   a device electrical connector adapted for mating with a compatible receptacle for receiving operating power and for transmitting the at least one pointing device output signal; and
   a frame for supporting the user manipulation member, the sensors, the transform circuit and the device electrical connector in a fixed relation with respect to the compatible receptacle, wherein:
   the transform circuit includes ramp circuits, comparators and a micro-controller; and
   the ramp circuits, comparators and the micro-controller cooperate to define three orthogonal axes of translation of the user manipulation of the member.

3. The computer pointing device as set forth in claim 2, wherein the sensors define a strain gauge assembly.

4. The computer pointing device as set forth in claim 3, wherein the strain gauge assembly defines a bridge network.

5. The computer pointing device as set forth in claim 2, wherein the at least one pointing device output signal defines a standard mouse output packet expressed as a digitally coded sequence.

6. The computer pointing device as set forth in claim 5, wherein the device electrical connector is a mini-DIN, 6-pin male connector.

7. The computer pointing device as set forth in claim 5, wherein two orthogonal axes correspond to side-to-side and forward-backward manipulation of the user manipulation member, while the third orthogonal axis corresponds to a downward-upward manipulation of the user manipulation member.

8. The computer pointing device as set forth in claim 2, wherein the frame defines an enclosure and encloses a portion of the user manipulation member, the sensors, the transform circuit, and a portion of the device electrical connector.

9. The computer pointing device as set forth in claim 8, wherein the device electrical connector is located along a side of the enclosure and is compatible with a P/S-2 mouse port connector.

10. The computer pointing device as set forth in claim 9, wherein the device connector and said side of the enclosure cooperate with a P/S-2 connector in a laptop computer for maintaining the computer pointing device in a precise alignment with the female receptacle and the laptop computer.

11. The computer pointing device as set forth in claim 2, further including at least one manually operated momentary switch providing a pair of electrical contacts connected to the transform circuit for controlling a portion of the at least one pointing device output signal.

12. The computer pointing device as set forth in claim 11, wherein the at least one manually operated momentary switch includes a portion extending through an opening in the enclosure for operation by a user.

13. The computer pointing device as set forth in claim 11, further including a pair of manually operated momentary switches connected for controlling a portion of the at least one pointing device output signal, each switch having a portion extending through an opening in the enclosure for operation by a user.

14. A computer pointing device for use with a laptop computer having a mini-DIN, 6-pin female receptacle along one side, wherein the receptacle provides operating power and accepts input signals compatible with a standard computer mouse, the pointing device comprising:
   a mini-DIN, 6-pin male connector for making a compatible connection with the female receptacle;
   a TrackPoint IV pointing device connected to the male connector for receiving operating power and supplying a standard mouse output signal;
   at least one manually operated momentary switch connected to the TrackPoint IV pointing device for providing select, activate, drag-and-drop signals via the standard mouse output signal; and
   an enclosure for supporting the male connector, the TrackPoint IV pointing device, and the at least one manually operated momentary switch in a fixed relation with respect to the female receptacle.

15. The apparatus of claim 14, further comprising the laptop computer.

* * * * *